United States Patent [19]

Sasaki et al.

[11] Patent Number: 4,687,811

[45] Date of Patent: Aug. 18, 1987

[54] POLYMERIZATION PROCESS FOR POLYESTER

[75] Inventors: Isao Sasaki; Hiroshi Mori, both of Otake, Japan

[73] Assignee: Mitsubishi Rayon Co., Ltd., Tokyo, Japan

[21] Appl. No.: 886,495

[22] Filed: Jul. 17, 1986

[30] Foreign Application Priority Data

Aug. 14, 1985 [JP] Japan ................................. 60-179212

[51] Int. Cl.$^4$ .......................... C08F 8/00; C08L 83/00
[52] U.S. Cl. ...................................... 525/100; 528/26; 528/274; 525/445; 525/446
[58] Field of Search ....................... 525/100, 445, 446; 528/26, 274

[56] References Cited

U.S. PATENT DOCUMENTS

| | | | |
|---|---|---|---|
| 4,183,874 | 1/1980 | Fan et al. | 525/100 |
| 4,191,714 | 3/1980 | Yonezawa et al. | 525/102 |
| 4,496,704 | 1/1985 | Ginnings | 528/26 |
| 4,640,962 | 2/1987 | Ostrozynski et al. | 525/474 |

FOREIGN PATENT DOCUMENTS

| | | |
|---|---|---|
| 0004947 | 10/1979 | European Pat. Off. . |
| 60-141714 | 7/1985 | Japan . |
| 60-141715 | 7/1985 | Japan . |

OTHER PUBLICATIONS

Search Report from European Pat. Appln. No. EP 86 30 5683.
Patent Abstracts of Japan, vol. 9, No. 301 (C-316) [2024], Nov. 28, 1985.

*Primary Examiner*—Lucille M. Phynes
*Attorney, Agent, or Firm*—Armstrong, Nikaido, Marmelstein & Kubovcik

[57] ABSTRACT

A process for producing a polyester in a stable emulsion state, which comprises thermal polymerization of a bis(ω-hydroxyalkyl)terephthalate or an oligomer thereof in the form of finely divided particles dispersed in a silicone oil by using a graft polymer, as a dispersion stabilizer, constructed of both a polysiloxane and an acrylic polymer.

14 Claims, No Drawings

POLYMERIZATION PROCESS FOR POLYESTER

BACKGROUND OF THE INVENTION

1. Field of the Invention

The present invention relates to a polymerization process for polyesters and more particularly to a process for producing a polyester, which comprises thermal polymerization of a bis(ω-hydroxyalkyl)terephthalate or an oligomer thereof in the form of fine particles emulsified in a silicone oil.

2. Description of the Prior Art

The bulk melt polymerization process has been most commonly applied to produce polyesters which are typified by polyethylene terephthalate. However, this process has several drawbacks such that as the molecular weight of polyester increases under polymerization, the melt viscosity thereof increases and more agitation power becomes necessary, that the increased melt viscosity makes worse the efficiency of heat transfer through walls of the polymerization vessel and hence the polymer is liable to undergo thermal degradation locally, and that a long time is required for taking out the polymer and this brings about difference in the degree of polymerization between the initially discharge polymer and the finally discharged polymer.

To overcome these drawbacks, the present inventors studied polymerizations of bis(ω-hydroxyalkyl)terephthalates (hereinafter referred to as BHT) or oligomer thereof. As a result, a very effective polymarization process for the polyester has been found out, which comprises dispersing BHT or an oligomer thereof with a dispersion stabilizer to a finely emulsified state in a silicone oil which is a medium inert to BHT or to the oligomer, and reacting the BHT or the oligomer to remove the alkyleneglycol therefrom. Thus the present invention has been accomplished.

SUMMARY OF THE INVENTION

Accordingly, it is an object of the invention to provide a process for polymerizing BHT or an oligomer thereof in emulsified form. It is another object of the invention to provide a process for polymerizing BHT or an oligomer thereof in a stabilized emulsion state.

DETAILED DESCRIPTION OF THE INVENTION

The substance of the invention is a process producing a polyester, which comprises thermal polymerization of a bis(ω-hydroxyalkyl)terephthalate or an oligomer thereof in the form of finely divided particles dispersed in a silicone oil by using a graft polymer, as a dispersion stabilizer, constructed of both a polysiloxane and an acrylic polymer.

BHT or its oligomer used in the invention is desired to have 2 to 6 carbon atoms in the alkyl group, and is obtained by reacting terephthalic acid or its ester-formable derivative with alkylene glycol or its ester-formable derivative.

The silicone oil used in the invention may by any of those stable physically and chemically at temperatures of at least 150° C. and inert to BHT or its oligomer. Such silicone oils include, for example, polydimethylsiloxane, polydiphenylsiloxane, polyphenylmethylsiloxane, and poly(dimethylsiloxane-diphenyylsiloxane).

The graft polymer used as a dispersion stabilizer in the invention is necessary for dispersing BHT or its oligomer in the silicone oil to a stable, finely divided particle state and for maintaining this good dispersion state. This graft polymer is constructed of a polysiloxane and an acrylic polymer and selected from the group consisting of graft polymers comprising polysiloxane stems and acrylic polymer branches and graft polymers comprising acrylic polymer stems and polysiloxane branches.

The stem polysiloxane to construct the former type of graft polymer can be produced by condensation of an organosiloxane with a functional group-containing silane which serves later as a graft linking agent. The main constitutional unit of this polysiloxane is represented by the formula

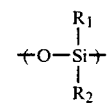

($R_1$ and $R_2$: hydrocarbon radicals). Preferably, the stem polysiloxane is produced from a main starting material selected from polydimethylsiloxane, polymethylphenylsiloxane, polydiphenylsiloxane, and the like which have 3 to 8 recurring units in the molecule, by condensation thereof with a graft linking agent at a temperature of 70° to 150° C. in the presence of a strong acid or base catalyst and a molecular weight regulator. Suitable graft linking agents in this case are silanes such as γ-methacryloyloxypropylmethylsilane, α-vinylmethylsilane, and γ-mercaptopropylmethylsilane which contain a methacryloyoxy group, vinyl group, mercapto group as respective functional groups, and particularly alkoxysilanes containing two alkoxy groups as functional groups in the molecule. Suitable molecular weight regulators are silane compounds, such as trimethylmethoxysilane and trimethylethoxysilane, which contain one alkoxy group in the molecule.

Polymerization for grafting acrylic polymer branches onto polysiloxane stems can be carried out in various ways, among which preferred is the way of polymerizing an acrylic monomer in the presence of the stem polysiloxane together with a radical polymerization initiator.

Suitable acrylic monomers for constituting the branch acrylic polymer include; acrylic esters e.g. methyl, ethyl, butyl, benzyl, phenyl, lauryl, stearyl, and cyclohexyl acrylates; methacrylic esters, e.g. methyl, ethyl, butyl, benzyl, phenyl, lauryl, stearyl, and cyclohexyl methacrylates; acrylic acid, methacrylic acid, 2-hydroxyethyl methacrylate, glycidyl methacrylate, acrylamide, and other acrylic acid or methacrylic acid derivatives containing functional groups. These monomers may be used alone or in combination one with another.

For securing the good stable dispersion, it is preferable to use a copolymer of an acrylic or methacrylic ester with acrylic or methacrylic acid or a copolymer of an acrylic or methacrylic ester with an acryclic or methacrylic derivative containing a functional group.

Moreover, superior dispersion stability of BHT or its oligomer can be achieved by addition reaction thereof to a graft polymer comprising a branch copolymer of an acrylic or methacrylic ester with glycidyl methacrylate.

On the other hand, the graft polymer comprising a stem acrylic polymer can be produced by polymerizing an acrylic monomer such as acrylic acid, methacrylic acid, acrylic ester, or methacrylic ester in the presence of a radical polymerization initiator along with a polysiloxane which contains a functional group such as methacryloyloxy, mercapto, or vinyl group at one terminal. The polysiloxane containing such a functional group is, for example, a polydimethylsiloxane terminated by a methacryloyloxypropyl, mercaptopropyl, or vinyl group. The molecular weight of such a polysiloxane is desirable at least 500, preferably at least 1000. When the molecular weight is lower, the dispersion stability will be deteriorated.

The dispersion stability of BHT or its oligomer, in the present invention, is given by the graft polymer, used as a dispersion stabilizer, which is composed of a polysiloxane having good affinity for the silicone oil and an acrylic polymer having good affinity for BHT or its oligomer.

The stem-to-branch weight ratio, i.e. the polysiloxane-to-acrylic polymer weight ratio, in the graft polymer is desired to be in the range of 80:20 to 20:80. The ratio out of this range results in deterioration of the dispersion stability. It is also desirable that the molecular weight of the graft polymer be in the range of 1,000 to 100,000. Departing from this range leads to deterioration of the dispersion stability.

In the present invention, such a graft polymer constructed of a polysiloxane and an acrylic polymer is used desirably in an amount of at least 0.1% by weight based on BHT or its oligomer. If this amount is less than 0.1% by weight, the dispersion stabilizing effect will be poor and in some cases there is a fear that BHT or its oligomer may form no fine particle or the dispersion in fine particle shapes may be broken and large agglomerates of the polyester may form.

In carrying out the present invention, BHT or its oligomer is dispersed in the silicone oil to a finely divided particle state in a suitable way such that the BHT or its oligomer is added to the silicone oil containing the graft polymer and shear is applied to the mixture or the graft polymer is added to the silicone oil containing the BHT or its oligomer in melt form and shear is applied to the mixture. Preferably, BHT or oligomer is added in the form of mixture with a solvent thereof to the silicone oil.

The solvent may be any of those which keep the liquid state up to 150° C. or higher and are able to dissolve BHT or its oligomer but limited amounts of the silicone oil. Such solvents include; aliphatic hydrocarbons, e.g. nonadecane; phenols, e.g. m-cresol, p-chlorophenol, xylenol, and phenol; and benzylalcohol, nitrobenzene, and tetrachloroethane-phenol mixtures.

Such a solvent and either BHT or its oligomer, when mixed and heated to a temperature of at least 150° C., from a nearly uniform solution, whereby the BHT or the oligomer can be trituated more effectively in the silicone oil. This facilitates the diffusion of alkylene glycol to the surface of fine particles of BHT or its oligomer, thus contributing greatly to the efficient polymerization thereof.

Particles sizes of BHT or its oligomer dispersed in the silicone oil are maintained desirably up to 300 μm, particularly in the range of 0.05 to 150 μm, in respect to easier elimination of alkylene glycol from the fine particles and in respect to higher dispersion stability of the fine particles in the silicone oil.

According to the present invention, acrylic polymer molecules are arranged with high affinity on surfaces of the fine particles of BHT or its oligomer while polysiloxane molecules are arranged on the silicone oil sides of the acrylic polymer layers, thereby forming a very stable nonaqueous emulsion of BHT or its oligomer.

This emulsion is heated at a temperature of at least 150° C., preferably from 180° to 300° C., to polymerize the BHT or the oligomer. The polymerization can be accomplished in the presence of no catalyst or a known catalyst such as antimony trioxide.

According to the present invention, the fine particles of BHT or its oligomer are dispersed stably and uniformly in the silicone oil, the polymerization of the finely divided particles proceeds effectively, the torque of agitation does not increase with the increasing molecular weight of the resulting polyester, the efficiency of heat transfer from the polymerization vessel is not varied, and the intended polyester of high intrinsic viscosity is yielded in the form of fine particles.

The resulting polyester is separated from the medium of the reaction system and thoroughly washed with an organic solvent. The obtained polyester can also be subjected to a molecular weight increasing reaction. The silicone oil separated from the reaction system is filtered, freed from the alkylene glycol by distillation, and recycled for reuse in the reaction system.

The process of the present invention can be applied not only to the production of polyethylene terephthalate but also satisfactorily to the production of polybutylene terephthalate or a copolyester comprising an alkylene terephthalate as a main constitutional unit.

The following examples illustrate the present invention. In the examples, parts and percentages are all by weight.

REFERENCE EXAMPLE

Preparation of Dispersion Stabilizer (1) Preparation of graft polymer comprising acrylic polymer stems and polysiloxane branches An acrylic monomer and a polysiloxane, as shown in Table 1, and 3 parts of benzoyl peroxide and 500 parts of toluene were charged into a 3-l flask equipped with a stirrer. After replacement of the air in the flask with nitrogen, the monomer was polymerized at 90° C. for 8 hours. The resulting polymer-containing solution was poured into a large amount of methanol, and the precipitated polymer was recovered and dried. In this manner, graft polymers No. 1 to No. 17 were prepared.

(2) Preparation of graft polymers comprising polysiloxane stems and acrylic polymer branches (a) A stem polysiloxane was prepared in latex form by charging a siloxane compound as shown in Table 2, 1 part of dodecylbenzenesulfonic acid, and 400 parts of demineralized water in a 3-l flask equipped with a stirrer, replacing the air in the flask with nitrogen, and polymerizing the siloxane at 90° C. for 6 hours.

This polymer latex was neutralized with an aqueous sodium hydroxide solution to pH 7, an acrylic monomer was added thereto in a polysiloxane/acrylic monomer ratio as shown in Table 2, the air in the flask was replaced with nitrogen, the mixture was heated to 80° C., and t-butyl hydroperoxide was added in an amount of 1% based on the acrylic monomer, thereby polymerizing the monomer for 6 hours. The resulting polymer solution was poured into a large amount of methanol, and the precipitated polymer was recovered and dried. In this manner, graft polymers No. 18 to No. 33 were prepared.

(b) Ten parts of graft polymer No. 23 shown in Table 2 and 20 parts of bis(hydroxyethyl)terephthalate, together with 100 parts of toluene, were charged into a 500-ml flask equipped with a stirrer and reacted at 140° C. for 6 hours under a stream of nitrogen. The resulting solution was poured into a large amount of methanol, and the precipitated polymer was recovered and dried, thus yielding graft polymer No. 34.

TABLE 1

| Graft polymer | | No. 1 | No. 2 | No. 3 | No. 4 | No. 5 | No. 6 |
|---|---|---|---|---|---|---|---|
| Polysiloxane | Species | I (M.W. = 5000) | I (M.W. = 5000) | I (M.W. = 5000) | I (M.W. = 5000) | I (M.W. = 5000) | I (M.W. = 290) |
| | Amount (part) | 100 | 70 | 140 | 30 | 170 | 100 |
| Acrylic monomer | Species | Methyl methacrylate | Methyl methacrylate | Methyl methacrylate | Methyl methacrylate | Methyl methacrylate | Methyl methacrylate |
| | Amount (part) | 100 | 140 | 70 | 170 | 30 | 100 |
| | Species | | | | | | |
| | Amount (part) | | | | | | |
| Polysiloxane/acrylic monomer ratio | | 50/50 | 36/65 | 65/35 | 15/85 | 85/15 | 50/50 |
| Graft polymer | | No. 7 | No. 8 | No. 9 | No. 10 | No. 11 | No. 12 |
| Polysiloxane | Species | I (M.W. = 1000) | II (M.W. = 5000) | III (M.W. = 5000) | I (M.W. = 5000) | I (M.W. = 5000) | I (M.W. = 50000) |
| | Amount (parts) | 100 | 100 | 100 | 100 | 100 | 100 |
| Acrylic monomer | Species | Methyl methacrylate | Methyl methacrylate | Methyl methacrylate | Methyl methacrylate | Methyl methacrylate | Methyl methacrylate |
| | Amount (part) | 100 | 100 | 100 | 90 | 90 | 90 |
| | Species | | | | Glycidyl methacrylate | 2-Hydroxyethyl methacrylate | Acrylic acid |
| | Amount (part) | | | | 10 | 10 | 10 |
| Polysiloxane/acrylic monomer ratio | | 50/50 | 50/50 | 50/50 | 50/50 | 50/50 | 50/50 |

| Graft polymer | | | No. 13 | No. 14 | No. 15 | No. 16 | No. 17 |
|---|---|---|---|---|---|---|---|
| Polysiloxane | | Species | I (M.W. = 5000) | II (M.W. = 5000) | II (M.W. = 5000) | II (M.W. = 5000) | II (M.W. = 5000) |
| | | Amount (part) | 100 | 100 | 100 | 100 | 100 |
| Acrylic monomer | | Species | Methyl methacrylate | Ethyl acrylate | Phenyl methacrylate | Benzyl methacrylate | Methyl methacrylate |
| | | Amount (part) | 90 | 100 | 100 | 100 | 100 |
| | | Species | Acrylamide | | | | |
| | | Amount (part) | 10 | | | | |
| Polysiloxane/acrylic | | | 50/50 | 50/50 | 50/50 | 50/50 | 50/50 |

I: Polydimethylsiloxane terminated by a methacryloyoxypropyl group
MW: Molecular weight
II: Polydimethylsiloxane terminated by a mercaptopropyl group
III: Polydimethylsiloxane terminated by a vinyl group

TABLE 2

| Graft polymer | | | No. 18 | No. 19 | No. 20 | No. 21 | No. 22 | No. 23 |
|---|---|---|---|---|---|---|---|---|
| Polysiloxane composition | Siloxane | Species | Polydimethylsiloxane (n = 3-6) | Polydimethylsiloxane (n = 3-6) | Polydimethylsiloxane (n = 3-6) | Polydimethylsiloxane (n = 3-6) | Polydimethylsiloxane (n = 3-6) | Polydimethylsiloxane (n = 3-6) |
| | | Amount (part) | 95 | 95 | 95 | 95 | 95 | 95 |
| | Molecular weight regulator | Species | Methoxytrimethylsiloxane | Methoxytrimethylsiloxane | Methoxytrimethylsiloxane | Methoxytrimethylsiloxane | Methoxytrimethylsilane | Methoxytrimethylsilane |
| | | Amount (part) | 1 | 1 | 1 | 1 | 1 | 1 |
| | Graft linking agent | Species | I | I | I | I | I | II |
| | | Amount (part) | 4 | 4 | 4 | 4 | 4 | 4 |
| Acrylic monomer | | Species | Methyl methacrylate | Methyl methacrylate | Methyl methacrylate | Methyl methacrylate | Methyl methacrylate | Methyl methacrylate |
| | | Amount (part) | 100 | 190 | 54 | 18 | 570 | 100 |
| | | Species | | | | | | |
| | | Amount (part) | | | | | | |
| Siloxane compound/acrylic monomer ratio | | | 50/50 | 35/65 | 65/35 | 85/15 | 15/85 | 50/50 |
| Graft polymer | | | No. 24 | No. 25 | No. 26 | No. 27 | No. 28 | No. 29 |
| Poly- | Siloxane | Species | Polydimethyl- | Polydimethyl- | Polydimethyl | Polydimethyl | Polydimethyl | Polydimethyl |

TABLE 2-continued

| siloxane composition | | | siloxane (n = 3-6) | siloxane (n = 3-6) | siloxane (n = 3-6) | siloxane (n = 3-6) | siloxane (n = 3-6) | siloxane (n = 3-6) |
|---|---|---|---|---|---|---|---|---|
| | | Amount (part) | 95 | 95 | 95 | 95 | 95 | 95 |
| | Molecular weight regulator | Species | Methoxytrimethylsilane | Methoxytrimethylsilane | Methoxytrimethylsilane | Methoxytrimethylsilane | Methoxytrimethylsilane | Methoxytrimethylsilane |
| | | Amount (part) | 1 | 1 | 1 | 1 | 1 | 1 |
| | Graft linking agent | Species | III | I | I | I | I | I |
| | | Amount (part) | 4 | 4 | 4 | 4 | 4 | 4 |
| Acrylic monomer | | Species | Methyl methacrylate | Methyl methacrylate | Methyl methacrylate | Methyl methacrylate | Methyl methacrylate | Ethyl methacrylate |
| | | Amount (part) | 100 | 90 | 90 | 90 | 90 | 100 |
| | | Species | | Glycidyl methacrylate | 2-Hydroxyethyl methacrylate | Acrylic acid | Acrylamide | |
| | | Amount (part) | | 10 | 10 | 10 | 10 | |
| Siloxane compound/acrylic monomer ratio | | | 50/50 | 50/50 | 50/50 | 50/50 | 50/50 | 50/50 |

| | | | | Graft polymer | No. 30 | No. 31 | No. 32 | No. 33 |
|---|---|---|---|---|---|---|---|---|
| | Polysiloxane composition | Siloxane | Species | | Polydimethylsiloxane (n = 3-6) | Polydimethylsiloxane (n = 3-6) | Polymethylphenylsiloxane (n = 3-6) | Polydimethylsiloxane (n = 3-6) |
| | | | Amount (part) | | 95 | 95 | 95 | 95 |
| | | Molecular weight regulator | Species | | Methoxytrimethylsilane | Methoxytrimethylsilane | Methoxytrimethylsilane | Methoxymethylsilane |
| | | | Amount (part) | | 1 | 1 | 1 | 1 |
| | | Graft linking agent | Species | | I | I | I | I |
| | | | Amount (part) | | 4 | 4 | 4 | 4 |
| | Acrylic monomer | | Species | | Phenyl methacrylate | Benzyl methacrylate | Methyl methacrylate | |
| | | | Amount (part) | | 100 | 100 | 100 | |
| | | | Species | | | | | |
| | | | Amount (part) | | | | | |
| | Siloxane compound/acrylic monomer ratio | | | | 50/50 | 50/50 | 50/50 | 100/0 |

I: Methacryloyloxypropylmethylsiloxane
II: Vinylmethylsiloxane
III: Mercaptopropylmethylsiloxane

EXAMPLES 1 TO 37 AND COMPARATIVE EXAMPLES 1 TO 3

Polymerization for Polyester

Each of raw material mixtures shown in Table 3 was charged into a 500-ml flask equipped with a stirrer and was heated to 270° C. under a nitrogen atmosphere. After bis(ω-hydroxyethyl)terephthalate or its oligomer, i.e. a source of polyester, had melted, the polymerization through the ethylene glycol eliminating reaction was effected in vacuo for 2 hours while stirring. Then the reaction mixture was cooled and the formed precipitate was washed with toluene to recover a polyester resin.

The following evaluations were made on each polymerization run. Results of the evaluations are shown in Table 3.

(1) Amount of polymer block

Amounts of polymer block in the recovered polymers and those clinging to the stirrer were measured. The results were ranked as follows:

◎ Practically no polymer block was found.
○ A little polymer block was found.
Δ Much polymer block was found.
x Extremely much polymer block was found.

(2) Shape of polymer particle

Shapes of polymer particles sampled during and after each polymerization run were evaluated by microscopic observation. The results were ranked as follows:

◎ The latex after polymerization was very stable and the obtained polymer particles were fine and spherical in shape.
○ The latex after polymerization was stable, but some particles of the polymer were deformed to dumbbel shapes or egg shapes conceivably resulting from association.
Δ A number of polymer particles were deformed and sometimes coarse particles of 1,000 μm or larger sizes were observed.
x During polymerization, some particles broke or disappeared and lumps of polymer formed.

(3) Size of polymer particle

The average particle diameter of the sample polymer was determined by microscopic observation (magnification: 100).

(4) Intrinsic viscosity

The intrinsic viscosity of the sample polymer was determined by measuring viscosities at 25° C. of solutions of the polymer in a 50:50 (by weight) phenol/tetrachloroethane mixture at three different concentrations of 0.5 g/dl, 0.25 g/dl, and 0.125 g/dl.

A large amount of polymer block in (1) above and many deformed polymer particles in (2) above indicate low dispersion stability of bis(ω-hydroxyethyl)terephthalate or its olignomer, which results in large agglomerates of polyester.

TABLE 3

| | | Example 1 | Example 2 | Example 3 | Example 4 | Example 5 | Example 6 | Example 7 | Example 8 | Example 9 | Example 10 | Example 11 |
|---|---|---|---|---|---|---|---|---|---|---|---|---|
| Raw material for polyester | Species | BHET* | BHET* | BHET* | BHET* | BHET* | BHET* | BHET* | BHET* | BHET* | BHET* | BHET* |
| | Amount (part) | 80 | 80 | 80 | 80 | 80 | 80 | 80 | 80 | 80 | 80 | 80 |
| Silicone oil | Species | Polydimethyl-siloxane | Polydimethyl-siloxane | Polydimethyl-siloxane | Polydimethyl-siloxane | Polydimethyl-siloxane | Polydimethyl-siloxane | Polydimethyl-siloxane | Polydimethyl-siloxane | Polydimethyl-siloxane | Polydimethyl-siloxane | Polydimethyl-siloxane |
| | Amount (part) | 120 | 120 | 120 | 120 | 120 | 120 | 120 | 120 | 120 | 120 | 120 |
| Polymerization catalyst Sb₂O₃, Amount (part) | | 0.02 | 0.02 | 0.02 | 0.02 | 0.02 | 0.02 | 0.02 | 0.02 | 0.02 | 0.02 | 0.02 |
| Dispersion stabilizer | Graft polymer | No. 1 | No. 2 | No. 3 | No. 4 | No. 5 | No. 6 | No. 7 | No. 8 | No. 9 | No. 10 | No. 11 |
| | Amount (part) | 2 | 2 | 2 | 2 | 2 | 2 | 2 | 2 | 2 | 2 | 2 |
| Evaluation | Amount of polymeric waste | ○ | ○ | ○ | ○ | ○ | △ | ○ | ○ | ○ | ⊙ | ⊙ |
| | Shape of polymer particle | ○ | ○ | ○ | △ | △ | △ | ⊙ | ⊙ | ⊙ | ⊙ | ⊙ |
| | Mean diameter of polymer particle (μm) | 50 | 70 | 70 | 150 | 180 | 280 | 60 | 90 | 90 | 50 | 50 |
| | Intrinsic viscosity (dl/g) | 0.98 | 0.90 | 0.90 | 0.87 | 0.84 | 0.73 | 0.97 | 0.93 | 0.92 | 0.99 | 0.97 |

| | | Example 12 | Example 13 | Example 14 | Example 15 | Example 16 | Example 17 | Example 18 | Example 19 | Example 20 | Example 21 | Example 22 |
|---|---|---|---|---|---|---|---|---|---|---|---|---|
| Raw material for polyester | Species | BHET* | BHET* | BHET* | BHET* | BHET* | BHET* | BHET* | BHET* | BHET* | BHET* | BHET* |
| | Amount (part) | 80 | 80 | 80 | 80 | 80 | 80 | 80 | 80 | 80 | 80 | 80 |
| Silicon oil | Species | Polydimethyl-siloxane | Polydimethyl-siloxane | Polydimethyl-siloxane | Polydimethyl-siloxane | Polydimethyl-siloxane | Polydimethyl-siloxane | Polydimethyl-siloxane | Polydimethyl-siloxane | Polydimethyl-siloxane | Polydimethyl-siloxane | Polydimethyl-siloxane |
| | Amount (part) | 120 | 120 | 120 | 120 | 120 | 120 | 120 | 120 | 120 | 120 | 120 |
| Polymerozation catalyst Sb₂O₃, Amount (part) | | 0.02 | 0.02 | 0.02 | 0.02 | 0.02 | 0.02 | 0.02 | 0.02 | 0.02 | 0.02 | 0.02 |
| Dispersion stabilizer | Graft polymer | No. 12 | No. 13 | No. 14 | No. 15 | No. 16 | No. 18 | No. 19 | No. 20 | No. 21 | No. 22 | No. 23 |
| | Amount (part) | 2 | 2 | 2 | 2 | 2 | 2 | 2 | 2 | 2 | 2 | 2 |
| Evaluation | Amount of polymeric waste | ⊙ | ⊙ | ⊙ | ⊙ | ⊙ | ○ | ○ | ○ | △ | △ | ○ |
| | Shape of polymer particle | ⊙ | ⊙ | ○ | ○ | ○ | ⊙ | ⊙ | ⊙ | ⊙ | △ | ○ |
| | Mean diameter of polymer particle (μm) | 50 | 50 | 50 | 60 | 50 | 70 | 110 | 110 | 200 | 170 | 150 |
| | Intrinsic viscosity (dl/g) | 0.95 | 0.93 | 0.96 | 0.95 | 0.93 | 0.90 | 0.91 | 0.89 | 0.81 | 0.83 | 0.86 |

| | | Example 23 | Example 24 | Example 25 | Example 26 | Example 27 | Example 28 | Example 29 | Example 30 | Example 31 | Example 32 | Example 33 |
|---|---|---|---|---|---|---|---|---|---|---|---|---|
| Raw material for polyester | Species | BHET* | BHET* | BHET* | BHET* | BHET* | BHET* | BHET* | BHET* | BHET* | BHET* | BHET* |
| | Amount (part) | 80 | 80 | 80 | 80 | 80 | 80 | 80 | 80 | 80 | 80 | 80 |

TABLE 3-continued

| Silicon oil | Species | Polydimethyl-siloxane | Polydimethyl-siloxane | Polydimethyl-siloxane | Polydimethyl-siloxane | Polydimethyl-siloxane | Polydimethyl-siloxane | Polydimethyl-siloxane | Polydimethyl-siloxane | Polymethyl-phenylsiloxane | Polydimethyl-siloxane | Polydimethyl-siloxane |
|---|---|---|---|---|---|---|---|---|---|---|---|---|
| | Amount (part) | 120 | 120 | 120 | 120 | 120 | 120 | 120 | 120 | 120 | 120 | 120 |
| Polymerization catalyst Sb₂O₃, Amount (part) | | 0.02 | 0.02 | 0.02 | 0.02 | 0.02 | 0.02 | 0.02 | 0.02 | 0.02 | 0.02 | 0.02 |
| Dispersion stabilizer | Graft polymer | No. 24 | No. 25 | No. 26 | No. 27 | No. 28 | No. 29 | No. 30 | No. 31 | No. 32 | No. 34 | No. 1 |
| | Amount (part) | 2 | 2 | 2 | 2 | 2 | 2 | 2 | 2 | 2 | 2 | 0.3 |
| Evaluation | Amount of polymeric waste | ○ | ○ | ○ | ○ | ○ | ○ | ○ | ○ | ○ | ○ | ○ |
| | Shape of polymeric particle | ○ | ○ | ○ | ○ | ○ | △ | △ | △ | ○ | ○ | ○ |
| | Mean diameter of polymer particle (μm) | 120 | 70 | 60 | 70 | 70 | 130 | 140 | 130 | 140 | 60 | 130 |
| | Intrinsic viscosity (dl/g) | 0.88 | 0.91 | 0.96 | 0.86 | 0.84 | 0.88 | 0.89 | 0.86 | 0.87 | 0.96 | 0.90 |

| | | Example 34 | Example 35 | Example 36 | Example 37 | Comparative Example 1 | Comparative Example 2 | Comparative Example 3 |
|---|---|---|---|---|---|---|---|---|
| Raw material for polyester | Species | BHET* | BHET oligomer (n ≠ 8) | BHET/m-cresol 40/60 | BHET*/p-chlorophenol 40/60 | BHET | BHET | BHET |
| | Amount (part) | 80 | 80 | 80 | 80 | 80 | 80 | 80 |
| Silicone oil | Species | Polydimethyl-siloxane | Polydimethyl-siloxane | Polydimethyl-siloxane | Polydimethyl-siloxane | Polydimethyl-siloxane | Polydimethyl-siloxane | Polydimethyl-siloxane |
| | Amount (part) | 120 | 120 | 120 | 120 | 120 | 120 | 120 |
| Polymerization catalyst Sb₂O₃, Amount (part) | | 0.02 | 0.02 | 0.02 | 0.02 | 0.02 | 0.02 | 0.02 |
| Dispersion stabilizer | Graft polymer | No. 1 | No. 1 | No. 1 | No. 1 | | No. 17 | No. 33 |
| | Amount (part) | 0.05 | 2 | 2 | 2 | | 2 | 2 |
| Evaluation | Amount of polymeric waste | △ | ○ | ○ | ○ | — | — | — |
| | Shape of polymeric particle | △ | ○ | ○ | ○ | × | × | × |
| | Mean diameter of polymer particle (μm) | >500 | 80 | 40 | 40 | — | — | — |
| | Intrinsic viscosity (dl/g) | 0.65 | 0.92 | 1.02 | 0.96 | — | — | — |

*BHET: Bis(ω-hydroxyethyl)terephthalate

What is claimed is:

1. A process for producing a polyester, which comprises thermal polymerization of a bis(ω-hydroxyalkyl)-terephthalate or an oligomer thereof in the form of fine particles dispersed in a silicone oil by using a graft polymer, as a dispersion stabilizer, contructed of both a polysiloxane and an acrylic polymer.

2. The process of claim 1, wherein the graft polymer used as a dispersion stabilizer is constructed of a stem polysiloxane and a branch acrylic polymer.

3. The process of claim 1, wherein the graft polymer used as a dispersion stabilizer is constructed of a stem acrylic polymer and a branch polysiloxane.

4. The process of claim 1, wherein the polysiloxane consists mainly of at least one member selected from the group consisting of polydimethylsiloxane, polymethylphenylsiloxane, and polydiphenylsiloxane.

5. The process of claim 1, wherein the polysiloxane is produced by using at least one member, as a graft linking agent, selected from the group consisting of a polysiloxane having one terminal methacryloyloxy group, a polysiloxane having one terminal mercapto group, and a polysiloxane having one terminal vinyl group.

6. The process of claim 1, wherein the acrylic polymer is constituted of an acrylic monomer selected from the group consisting of an acrylic ester and a methacrylic ester.

7. The process of claim 6, wherein the acrylic ester is ethyl acrylate and the methacrylic ester is methyl methacrylate, benzyl methacrylate, or phenyl methacrylate.

8. The process of claim 2, wherein the acrylic polymer is a copolymer of (i) an acrylic monomer selected from the group consisting of alkyl acrylates and alkyl methacrylates and (ii) an acrylic monomer having at least one functional group selected from the group consisting of carboxyl, glycidyl, hydroxyl, amino, and carbamoyl groups.

9. The process of claim 8, wherein the acrylic monomer having at least one functional group is selected from the group consisting of acrylic acid, methacrylic acid, glycidyl methacrylate, 2-hydroxyethyl methacrylate, and acrylamide.

10. The process of claim 2, wherein the acrylic polymer is an adduct of either a bis(ω-hydroxyalkyl)terephthalate or an oligomer thereof to a copolymer of (i) an acrylic monomer selected from the group consisting of alkyl acrylates and alkyl methacrylates and (ii) a functional group-containing acrylic monomer selected from the group consisting of glycidyl acrylate and glycidyl methacrylate.

11. The process of claim 3, wherein the polysiloxane is produced by using at least one member, as a graft linking agent, selected from the group consisting of a polysiloxane having one terminal methacryloyloxy group, a polysiloxane having one terminal mercapto group, and a polysiloxane having one terminal vinyl group.

12. The process of claim 1, wherein the graft polymer used as a dispersion stabilizer is constructed of a polysiloxane and an acrylic polymer in a former-to-latter weight ratio of from 80/20 to 20/80.

13. The process of claim 1, wherein the bis(ω-hydroxyalkyl)terephthalate or the oligomer thereof is dispersed to particle sizes of up to 300 μm.

14. The process of claim 1, wherein the amount of the graft polymer used as a dispersion stabilizer is at least 0.1% by weight of the bis(ω-hydroxyalkyl)terephthalate or the oligomer thereof.

* * * * *